(12) United States Patent
Urano et al.

(10) Patent No.: US 11,085,779 B2
(45) Date of Patent: Aug. 10, 2021

(54) AUTONOMOUS VEHICLE ROUTE PLANNING

(71) Applicant: TOYOTA RESEARCH INSTITUTE, INC., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 171 days.

(21) Appl. No.: 16/220,977

(22) Filed: Dec. 14, 2018

(65) Prior Publication Data
US 2020/0191582 A1 Jun. 18, 2020

(51) Int. Cl.
| G01C 21/34 | (2006.01) |
| G05D 1/00 | (2006.01) |
| G06Q 10/02 | (2012.01) |
| G06Q 50/30 | (2012.01) |

(52) U.S. Cl.
CPC ..... *G01C 21/3438* (2013.01); *G01C 21/3453* (2013.01); *G05D 1/0061* (2013.01); *G05D 1/0088* (2013.01); *G06Q 10/02* (2013.01); *G06Q 50/30* (2013.01); *G05D 2201/0213* (2013.01)

(58) Field of Classification Search
CPC .................................................. G01C 21/3438
USPC ........................................................ 701/410
See application file for complete search history.

(56) References Cited

U.S. PATENT DOCUMENTS

| 6,411,897 B1* | 6/2002 | Gaspard, II ......... G01C 21/343 340/991 |
| 8,676,431 B1* | 3/2014 | Mariet .................. G08G 1/166 701/28 |
| 8,725,612 B2* | 5/2014 | Mundinger ........... G06Q 40/08 705/35 |
| 9,557,738 B2 | 1/2017 | Enke |
| 9,558,659 B1* | 1/2017 | Silver ............. B60W 30/18009 |
| 9,718,466 B2 | 8/2017 | Kim et al. |
| 10,082,793 B1* | 9/2018 | Glaser ................ G01C 21/3423 |
| 10,567,520 B2* | 2/2020 | Sweeney ............. H04L 65/4084 |
| 10,614,713 B2* | 4/2020 | Chen ..................... G08G 1/202 |
| 2015/0112585 A1* | 4/2015 | Knepper ............ G01C 21/3697 701/410 |
| 2015/0308842 A1* | 10/2015 | Meredith ............... G01C 21/30 701/410 |
| 2015/0339928 A1* | 11/2015 | Ramanujam .......... G06Q 50/30 701/23 |

(Continued)

OTHER PUBLICATIONS

Seshan, et al., "Efficient Route Finding and Sensors for Collision Detection in Google's Driverless Car," IJCSCMC, vol. 3, Issue 12, Dec. 2014, pp. 70-78.

*Primary Examiner* — Jean Paul Cass
(74) *Attorney, Agent, or Firm* — Seyfarth Shaw LLP

(57) ABSTRACT

A method for route planning for an autonomous vehicle includes determining whether a route to a destination includes a stall factor and determining whether the autonomous vehicle will be occupied during the route. The method also includes determining an alternate route based on the determined stall factor when the autonomous vehicle will be unoccupied. The method still further includes controlling the autonomous vehicle to drive on the alternate route when the alternate route does not include a stall factor.

20 Claims, 6 Drawing Sheets

(56) References Cited

U.S. PATENT DOCUMENTS

| | | | |
|---|---|---|---|
| 2016/0298977 A1* | 10/2016 | Newlin | G01C 21/20 |
| 2017/0282821 A1* | 10/2017 | Zych | B60W 50/0098 |
| 2017/0356751 A1 | 12/2017 | Iagnemma | |
| 2018/0136655 A1 | 5/2018 | Kim | |
| 2018/0352370 A1* | 12/2018 | Ball | G06F 16/24578 |
| 2019/0049968 A1* | 2/2019 | Dean | G05D 1/0088 |
| 2019/0176837 A1* | 6/2019 | Williams | B60W 50/02 |
| 2020/0004843 A1* | 1/2020 | Valegerepura | G01C 21/3605 |

* cited by examiner

AUTONOMOUS VEHICLE ROUTE PLANNING

BACKGROUND

Field

Certain aspects of the present disclosure generally relate to route planning and, more particularly, to a system and method for planning a route for an autonomous vehicle.

Background

Conventional navigation systems account for external factors when selecting a route to a destination. The external factors may include traffic, road hazards, and/or weather. Additionally, conventional navigation systems for non-autonomous vehicles may only determine a route to a destination. In contrast, autonomous vehicle navigation systems may determine a route to and from a destination. That is, the autonomous vehicle navigation system selects a route from a starting point to a destination and from the destination back to the starting point. For example, an autonomous taxi may pick up a customer at a taxi station, drive the customer to a destination, and return to the taxi station for another pickup.

For autonomous mobility-as-a-service (MAAS) vehicles, the autonomous MAAS vehicle may be unoccupied for one leg of a trip. For example, the autonomous MAAS vehicle may be occupied when traveling to a destination and may be unoccupied when traveling from the destination to a starting point. Therefore, in contrast to conventional navigation systems that only consider external factors, navigation systems for autonomous MAAS vehicles should be improved to consider the ability of the autonomous MAAS vehicle to successfully complete a route.

SUMMARY

In one aspect of the present disclosure, a method for route planning for an autonomous vehicle is disclosed. The method includes determining whether a stall factor is present during a route to a destination. The method also includes determining whether the autonomous vehicle will be occupied during the route. The method further includes determining an alternate route when the stall factor is present and when the autonomous vehicle is unoccupied during the route. The method still further includes control the autonomous vehicle to drive on the alternate route when the alternate route does not include a stall factor.

In another aspect of the present disclosure, a non-transitory computer-readable medium with non-transitory program code recorded thereon is disclosed. The program code is for route planning for an autonomous vehicle. The program code is executed by a processor and includes program code to determine whether a stall factor is present during a route to a destination. The program code also includes program code to determine whether the autonomous vehicle will be occupied during the route. The program code further includes program code to determining an alternate route when the stall factor is present and when the autonomous vehicle is unoccupied during the route. The program code still further includes program code to control the autonomous vehicle to drive on the alternate route when the alternate route does not include a stall factor.

Another aspect of the present disclosure is directed to an apparatus for route planning for an autonomous vehicle. The apparatus having a memory and one or more processors coupled to the memory. The processor(s) is configured to determine whether a stall factor is present during a route to a destination. The processor(s) is also configured to determine whether the autonomous vehicle will be occupied during the route. The processor(s) is further configured to determine an alternate route when the stall factor is present and when the autonomous vehicle is unoccupied during the route. The processor(s) still further configured to control the autonomous vehicle to drive on the alternate route when the alternate route does not include a stall factor.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
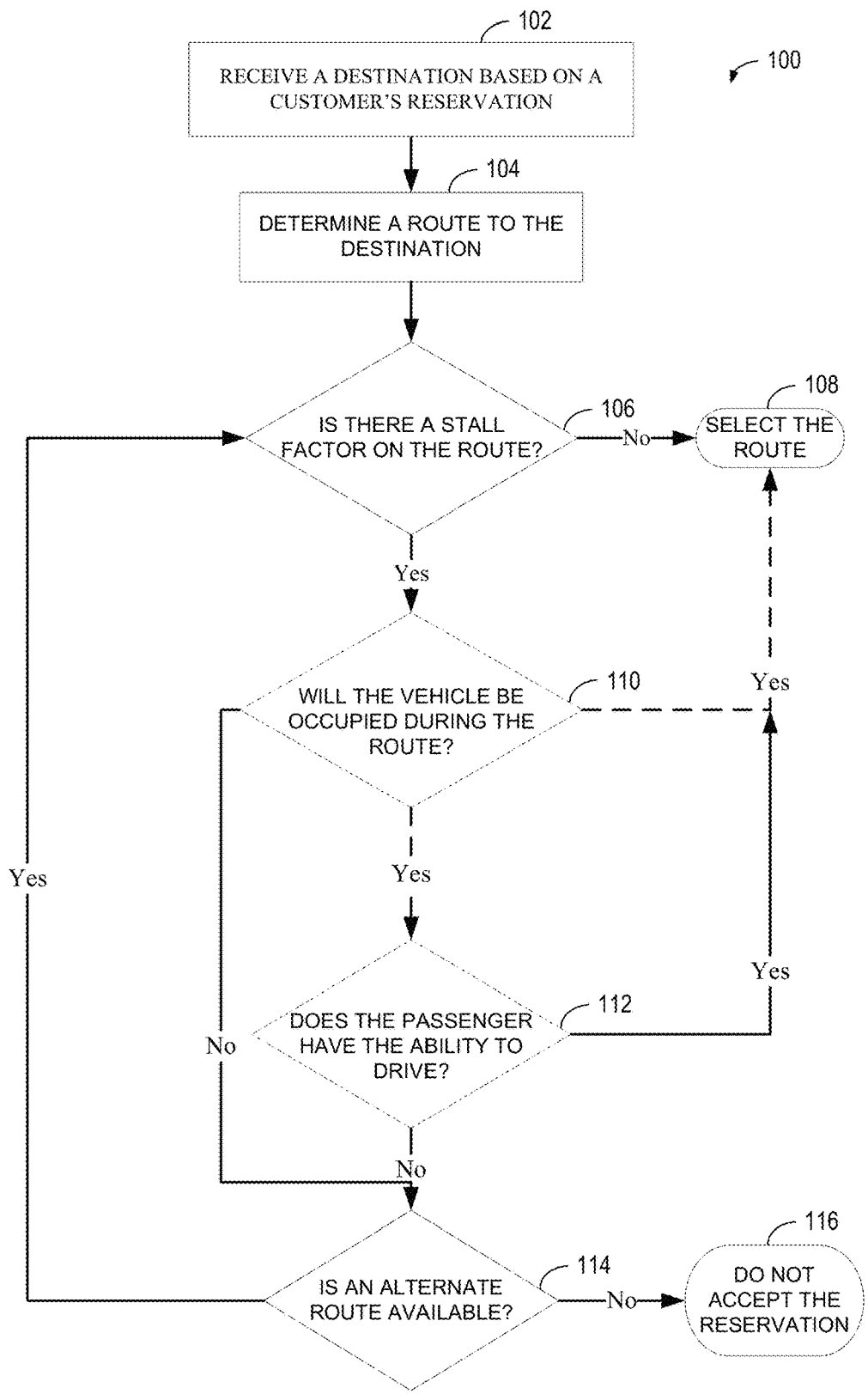
FIGS. 1 and 2 illustrate flow diagrams for determining whether to accept a reservation according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Conventional navigation systems account for external factors when selecting a route to a destination. The external factors may include traffic, road hazards, and/or weather. In most cases, conventional navigation systems select a route with a least number of external factors. For example, when determining a route based on travel time, the conventional navigation system may select a longer distance route that has less traffic in comparison to a shorter distance route.

Additionally, conventional navigation systems for non-autonomous vehicles may only determine a route to a destination. In contrast, a navigation system for an autonomous mobility-as-a-service (MAAS) vehicle may determine a route from an initial location to a destination and from the destination to a return location, such as the initial location. For example, the autonomous MAAS vehicle (e.g., autonomous taxi) may pick up a customer at an initial location (e.g., taxi station, airport, train station, etc.) drive the customer to a destination, and return to the location for another pickup. In this example, the autonomous MAAS vehicle is unoccupied after driving the customer to the destination.

Aspects of the present disclosure are not limited to an autonomous MAAS vehicle. Other vehicles are also considered. For example, aspects of the present disclosure may also be directed to an autonomous personally owned vehicle (POV). For example, an owner may commute to work by train. Still, the POV may drive the owner to the train station. In this example, a route planning system may consider a potential for stalling from the drop-off location (e.g., train station) to a return location (e.g., the owner's house). Additionally, when the owner is commuting from work to the train station, the owner may summon the POV to drive from the owner's home to the train station. In this example, the route planning system may consider a potential for stalling from an initial location to a pickup location. In the present application, for simplicity, the MAAS vehicle and the POV vehicle may be referred to as a vehicle.

Aspects of the present disclosure consider a potential for stalling during different types of routes. The routes may include a route from an initial location to a pickup location, a route from a pickup location to a drop-off location, and a route from the drop-off location to a return location. In some cases, a vehicle's trip includes all three routes or a combination of the routes.

In some cases, the vehicle may stall during a trip. For example, the vehicle may experience mechanical failure (e.g., flat tire, drained battery, etc.) or sensor failure (e.g., no GPS signal, no wireless-network signal, etc.). If the vehicle is occupied, the passenger(s) may provide assistance. For example, the passenger(s) may fix the mechanical failure, call for help, or walk to get help. In contrast, it may be difficult for an unoccupied vehicle to overcome a stall. For example, if the unoccupied vehicle stalls in an area without wireless-network service, the vehicle cannot call for assistance.

Aspects of the present disclosure are directed to determining whether a route includes a stall factor. An alternate route is selected if the route includes a stall factor. If an alternate route is not available, the vehicle does not drive on the route. The route refers to the route to meet a customer at a customer's location, a route to a destination, and/or a route from the destination to another location, such as an initial location.

As an example, a customer may reserve a vehicle. The vehicle reservation may include the customer's location and a destination. In response to receiving the reservation, the vehicle determines a pickup route to the customer's location, a destination route to the destination from the customer's location, and a return route to a return location. Each route may include multiple potential routes. In one configuration, the vehicle eliminates a potential route when there is a potential for stalling on the route.

The potential for stalling may be based on one or more stall factors such as low fuel, low battery, mobile service being less than a threshold, environmental considerations (e.g., bad weather), construction, road hazards, unmapped areas (e.g., private roads), out-of-date maps, accidents, sensor failure conditions, etc. The vehicle may select an alternate route if the route includes one or more stall factors. Prior to selecting an alternate route, the vehicle may determine whether it is safe to proceed on the route that includes one or more stall factors. For example, when determining whether it is safe to proceed on the route, the vehicle may determine: whether it will be occupied during the route; whether the passenger has a driver's license; and/or a duration of a stall factor.

The vehicle may accept a reservation if the vehicle can complete the trip without stalling. FIG. 1 illustrates an example of a flow diagram 100 for determining whether to accept a reservation according to aspects of the present disclosure. As shown in FIG. 1, at block 102, a vehicle receives a destination based on a customer's reservation. The destination refers to a location the vehicle will travel to/from its initial location. For example, the destination is the customer's location or the customer's intended destination. In this example, the vehicle drives to the customer's location to meet the customer (e.g., pick up the customer) and then drives the customer to their destination. In another example, the vehicle is at a pick-up location (e.g., airport pick-up lot) and the customer enters the vehicle at the pick-up location.

At block 104, the vehicle determines a route to the destination. The route may be based on external factors, such as traffic. For example, the route may be a route with a least travel time in view of the external factors. At block 106, the vehicle determines if the route includes a stall factor. The stall factor includes, but is not limited to, low resources (e.g., fuel, battery, etc.), environmental factors, road hazards, unmapped areas, out-of-date maps, traffic, accidents, sensor failure conditions, etc.

If the route does not include a stall factor, at block 108, the vehicle selects the route to the destination. In an optional configuration, if the route includes a stall factor, at block 110, the vehicle determines if it will be occupied during the route. The vehicle may be unoccupied if the route is from the vehicle's initial location to the customer pick-up location. Alternatively, the vehicle is occupied after picking up the customer (e.g., while driving the customer to their destination). When the vehicle is occupied, the passenger may provide assistance if the vehicle stalls. For example, the passenger may drive the vehicle, fix the failure, call for help, or walk to get help.

In this optional configuration, at block 112, the vehicle may further determine if the passenger (e.g., customer) has the ability to drive the vehicle. That is, the passenger may need to drive the vehicle should a stall occur. As such, if the passenger is not able to drive the vehicle, the passenger's presence is moot. The ability to drive may be determined from information, such as driver's license information, stored in a customer's profile.

In some cases, the customer that reserved the vehicle may be different from the passenger. Alternatively, the customer may be requesting the vehicle for the customer and one or more other passengers. In one configuration, the vehicle uses a scanner, or camera, to scan each passenger's driver's license to determine whether one or more passengers are able to drive the vehicle.

If the passengers cannot drive the vehicle, at block 114, the vehicle determines if an alternate route is available. Furthermore, if the vehicle is unoccupied during the route, at block 114, the vehicle determines if an alternate route is available. If an alternate route is available, at block 106, the vehicle determines whether the alternate route includes a stall factor. Alternatively, if an alternate route is not available, at block 116, the vehicle does not accept the customer's reservation. The customer may not override the vehicle's decision to cancel the reservation.

In one configuration, in addition to determining whether there is a potential for stalling on the route to a destination, the navigation system determines whether there is a potential for stalling on a return route from the destination. The return route refers to a route from the customer's destination to the vehicle's starting point or another location. Determining whether there is a potential for stalling on the return route may be made in conjunction with, or exclusive from, determining whether there is a potential for stalling on the route to the destination.

In most cases, the customer is not present during the return route. Still, there are situations where a customer may be present during the return route. For example, a vehicle owner may reserve the car to arrive at a location and drive the vehicle owner home. In this example, the vehicle owner's home is the return location. Thus, the vehicle owner (e.g., customer) is present during the return route.

Figure 2:
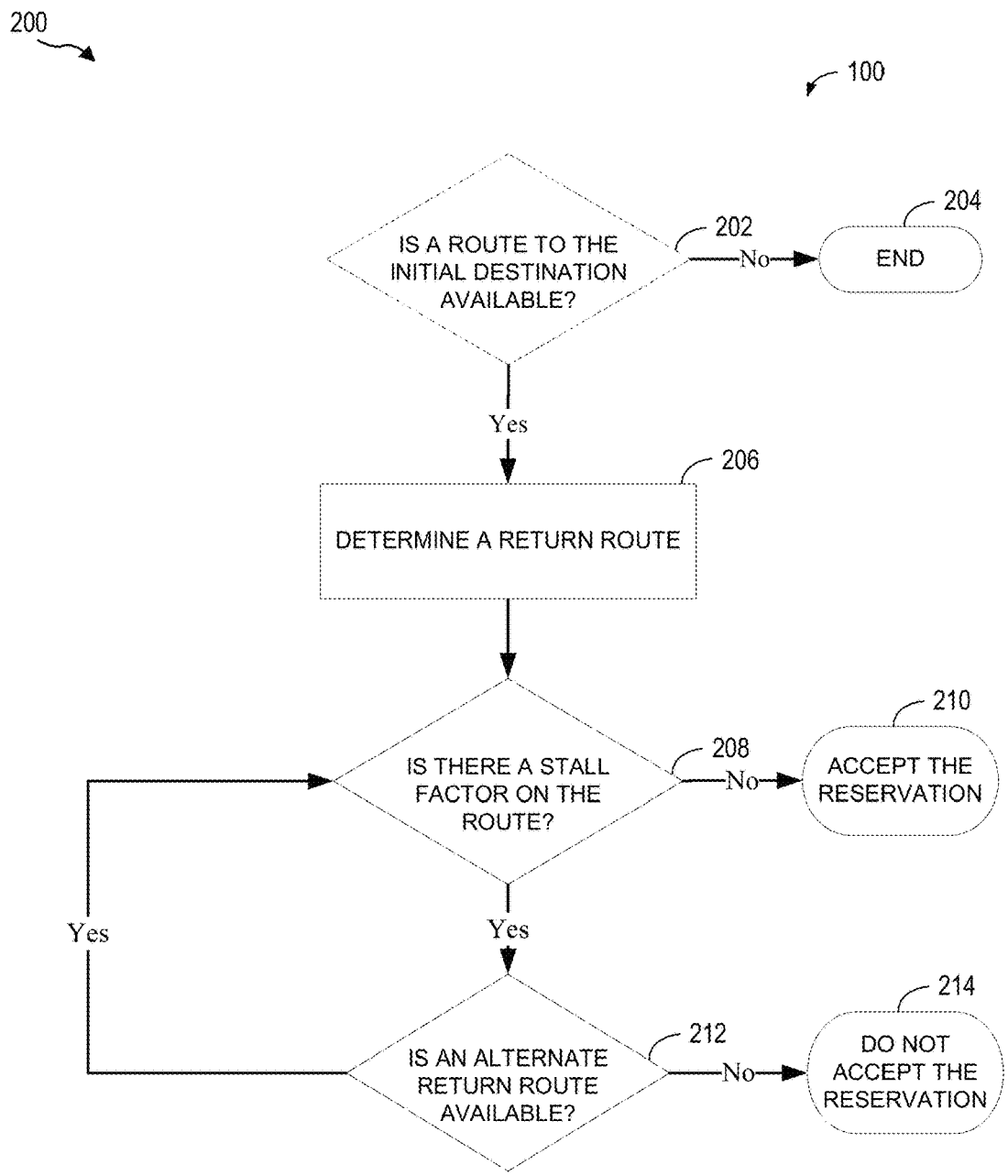

FIG. 2 illustrates a flow diagram 200 for determining whether to accept a reservation according to aspects of the present disclosure. In an optional configuration, at block 202, the navigation system determines whether a route to an initial destination (e.g., customer pickup location and/or customer drop-off location) is available. The navigation system may determine whether the route to the destination is available based on the flow diagram 100 of FIG. 1. If the route to the destination is not available, the process ends (block 204).

If the route to the initial destination is available, the navigation system determines a return route (block 206). Determining the return route may be exclusive of determining whether a route to the initial destination is available. After determining the return route, at block 208, the navigation system determines whether there is a stall factor on the route (e.g., return route). Although not shown in FIG. 2, in one configuration, the vehicle determines if it will be occupied during the return route. The vehicle may also determine if a passenger is capable of driving the vehicle. The occupancy determination and/or the passenger's ability to drive may be used to determine whether the vehicle should select a return route with a stall factor.

If the return route does not include a stall factor, the reservation is accepted (block 210). If the return route includes a stall factor, the navigation system determines if an alternate return route is available (block 212). If an alternate route is not available, the vehicle does not accept the reservation (block 214). If an alternate route is available, at block 208, the vehicle determines whether there is a stall factor on the route (e.g., alternate return route). If an alternate return route does not include a stall factor, at block 210, the vehicle accepts the customer's reservation. If the alternate route includes a stall factor, the process repeats, at block 212, where the vehicle determines if another alternate route is available. The customer may not override the vehicle's decision to cancel the reservation.

Figure 3A:
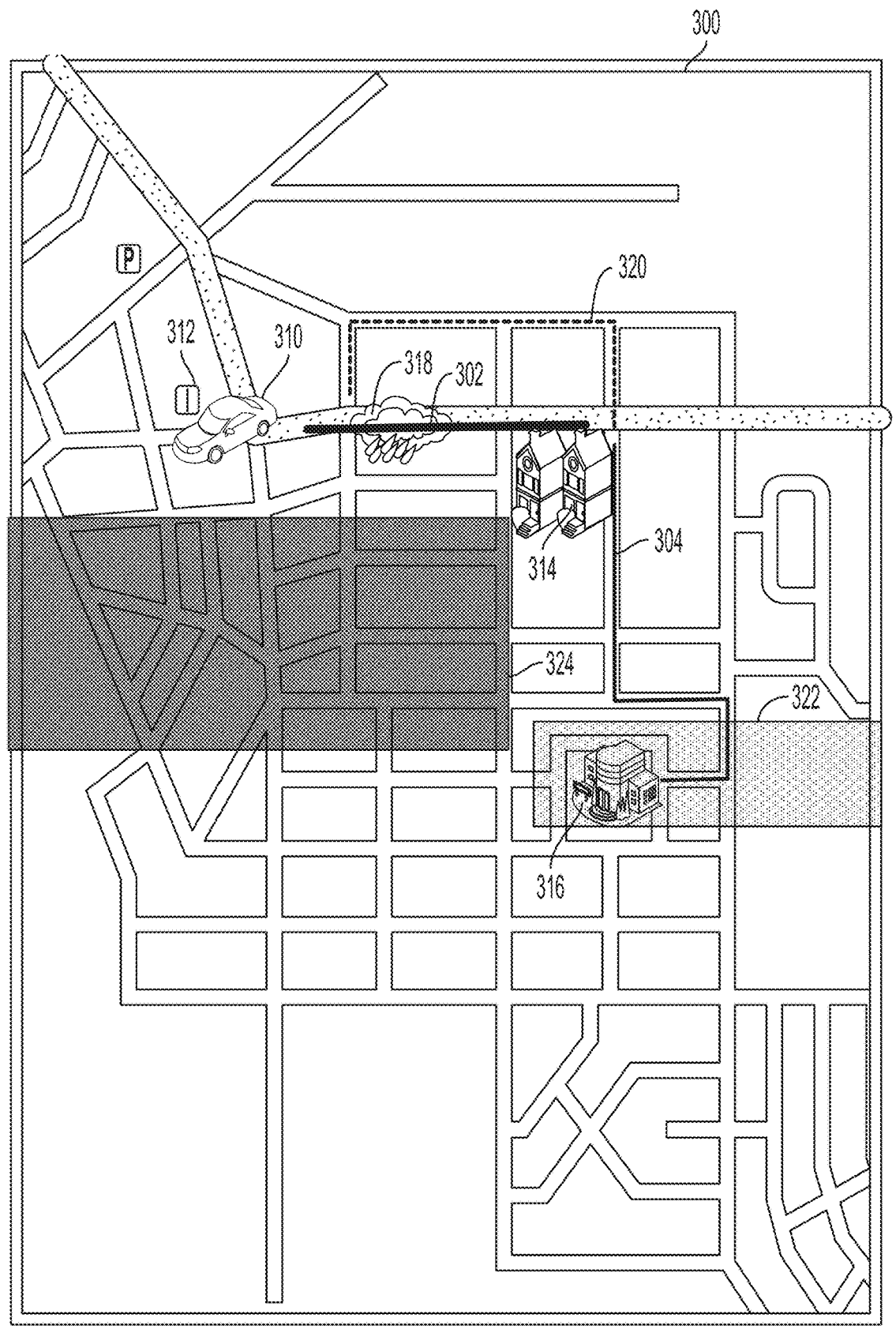
FIGS. 3A and 3B illustrate examples of selecting a route to a destination according to aspects of the present disclosure.

FIG. 3A illustrates an example of selecting a route 302, 304 to a destination 314, 316 according to aspects of the present disclosure. As shown in FIG. 3A, a vehicle 310 may be at an initial location 312 in an area 300. In this example, a portion of the area 300 includes rain 318. Furthermore, the area 300 includes an outdated map section 324 and a weak signal section 322. The outdated map section 324 refers to a portion of the area 300 where a time since a last map update is greater than a threshold. The outdated map section 324 may also refer to an area without map information, such as an area with private roads. The weak signal section 322 refers to a section where one or more transmission signals, such as cellular, WiFi, GPS, etc., have weak or no reception.

In this example, the vehicle 310 receives a reservation from a customer at a home 314. The reservation indicates that the customer would like to be dropped off at an office 316. Upon receiving the reservation, the vehicle 310 (e.g., the vehicle's 310 navigation system) determines a pickup route 302 to the home 314 (e.g., pickup destination) and a drop-off route 304 to the office 316 (e.g., drop-off destination). In some cases, the vehicle 310 may only determine a route to one destination. For example, if the customer meets the vehicle 310 at the vehicle's 310 initial location 312, the vehicle 310 only determines a route to the customer's drop-off destination 316. The vehicle 310 determines whether each route 302, 304 includes a stall factor.

In the present example, the vehicle 310 determines that there is rain 318 on a portion of the pickup route 302. As such, due to the rain 318 (e.g., stall factor), there is a potential for stalling on the pickup route 302. The rain 318 may cause sensor failure or mechanical failure (e.g., an accident) due to the wet conditions. The vehicle 310 may determine whether it will be occupied during the pickup route 302. In this example, the vehicle 310 is not occupied during the pickup route 302, therefore, the vehicle 310 determines an alternate pickup route 320. The vehicle 310 also determines if there is a stall factor on the alternate pickup route 320. Because the alternate pickup route 320 is clear of stall factors, the alternate pickup route 320 is selected as the route to the house 314.

After selecting the alternate pickup route 320, the vehicle 310 determines a drop-off route 304 from the house 314 (e.g., customer's location) to the office 316 (e.g., customer's drop-off destination). The vehicle 310 determines if there is a stall factor on the drop-off route 320. As shown in FIG. 3A, a portion of the drop-off route 304 overlaps with the weak signal section 322 (e.g., stall factor). As such, there is a potential for stalling in the weak signal section 322. The stall may be caused by sensor failure due to a weak signal. Additionally, should a mechanical failure occur, the vehicle 310 may not be able to call for help due to the weak signal.

Because the drop-off route 304 includes a stall factor, the vehicle 310 determines whether it will be occupied during the drop-off route 304. In this example, the customer will be in the vehicle 310 during the drop-off route 304. In one configuration, the vehicle 310 further determines if the customer is capable of driving the vehicle 310 in a manual mode. The determination may be based on information in the customer's profile. For example, the customer's profile may include the customer's driver's license information. In the example of FIG. 3A, it is assumed that the customer is capable of driving the vehicle 310. As such, the vehicle 310 selects the drop-off route 304 event though there is a potential for stalling.

Figure 3B:
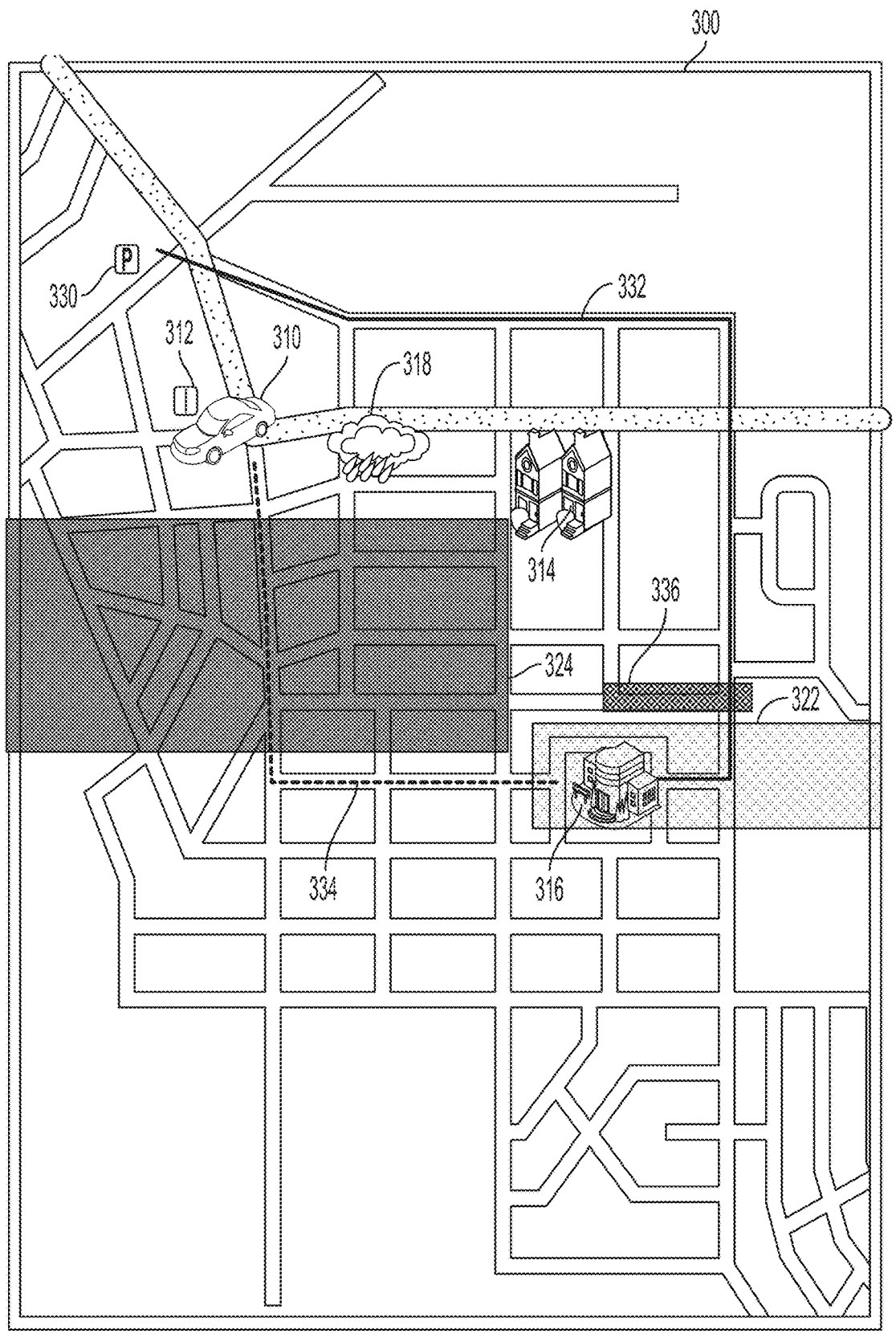

After determining that the vehicle 310 may navigate routes 304, 320 to the destinations 314, 216, the vehicle 310 may confirm the reservation. In one configuration, prior to confirming the reservation, the vehicle 310 determines whether a return route is available. The return route is a route from the customer drop-off location 316 to the vehicle's 310 next location, such as a designated starting point or another customer pickup. FIG. 3B illustrates an example of selecting a return route 332, 334 according to aspects of the present disclosure.

In the example of FIG. 3B, the vehicle 310 determines a return route 332 from the office 316 (e.g., customer drop-off location) to a return location 330, such as a parking lot. After determining the return route 332, the vehicle 310 determines if the return route 332 includes a stall factor. As shown in FIG. 3B, a portion of the return route 332 overlaps with the weak signal section 322 (e.g., stall factor). As such, there is a potential for stalling in the weak signal section 322.

Because there is a potential for stalling on the return route 332, the vehicle 310 determines whether the vehicle 310 will be occupied during the return route 332. In this example, because the return route 332 is after the customer drop-off, the vehicle 310 will be unoccupied. Therefore, the vehicle 310 determines an alternate return route 334.

In response to determining the alternate return route 334, the vehicle 310 determines whether the alternate return route 334 includes a stall factor. As shown in FIG. 3B, a portion of the alternate return route 334 overlaps with the outdated map section 324 (e.g., stall factor). As such, there is a potential for stalling in outdated map section 324. An outdated map may cause a stall because the roads may be unknown or one or more roads may be inaccessible (e.g., private roads). Because there is a potential for stalling on the alternate return route 334, the vehicle 310 determines whether it will be occupied during the alternate return route 334. In this example, the alternate return route 334 is after the customer drop-off, thus, the vehicle 310 will be unoccupied. The vehicle 310 determines if there is yet another route to the return location 330.

In this example, the return route 332 and the alternate return route 334 are the only routes available to the return location 330. In one configuration, the vehicle 310 cancels the reservation if a return route is not available. In another configuration, the vehicle 310 determines an alternative pickup or drop-off location if the vehicle has a potential for stalling on one or more of the routes (e.g., destination route or return route).

In the example of FIG. 3B, the vehicle 310 has a potential for stalling on both the return route 332 and the alternate return route 334. Thus, the vehicle 310 determines whether a return route without a stall factor is available if an alternate return area or an alternate drop-off area is selected. The alternate return area and the alternate drop-off destination are within a pre-determined distance from the original return area 330 and original drop-off destination 316, respectively. In this example, the vehicle 310 selects an alternate drop-off area 336 that is within a pre-determined distance from the original drop-off destination 316. The alternate drop-off destination may also include a pre-determined location or a mass transit location, such as a bus stop or a train state. The mass transit location may be the nearest mass transit location to the original drop-off destination 316.

The vehicle 310 determines whether there is stall factor on the return route 332 and/or the alternate return route 334 if the original drop-off destination 316 is changed to the alternate drop-off area 336. As shown in FIG. 3B, the return route 332 would bypass the weak signal section 322 if the return route 332 originated from a location within the alternate drop-off area 336. Therefore, selecting the return route 332 avoids a known stall factor. In this configuration, rather than canceling the reservation, the vehicle 310 may offer the customer the option of canceling or selecting the alternate drop-off area 336. The vehicle 310 may also provide a reason why it cannot use the original drop-off destination 316.

To aspects of the present disclosure, the navigation system (e.g., vehicle) determines whether the stall factor is temporary. For example, if a potential stall is based on rain, the navigation system estimates the rain's duration. The estimated duration of a stall factor, such as the rain, may be obtained from a command center, weather data, traffic data, communications with other vehicles, or other data sources. In this example, the vehicle may still accept the reservation if the rain is estimated to dissipate prior to the vehicle reaching the rain's location.

Additionally, or alternatively, if the stall factor is temporary, the navigation system may wait for the stall factor to end before embarking on the route. In one configuration, navigation system determines if the wait time is less than a threshold. If the wait time is less than the threshold, the navigation system may wait for the stall factor to end. The navigation system may also give the customer an option for waiting for the stall factor to end or cancelling the reservation. If the wait time is greater than the threshold, the navigation system may cancel the reservation.

As discussed, to accept a reservation, the navigation system may determine whether the vehicle has a potential for stalling on a route to one or more destinations. The destinations may include a pickup location, a drop-off location, a return location, or other type of location. If a route to a destination includes a stall factor, the vehicle may cancel the reservation. Alternatively, the navigation system may offer one or more alternative destinations that allow the vehicle to bypass portions of the route with a stall factor. The alternative destination is a destination or area, such as a main thoroughfare, near an original destination.

Additionally, or alternatively, if a stall factor is temporary, the navigation system may estimate the stall factor's duration. The navigation system may inform the customer that there is a delay due to a stall factor. The customer may choose to cancel the reservation or wait for the stall factor to end. If the delay is greater than a delay threshold, the navigation system may cancel the reservation without giving the customer an option to accept the reservation.

The stall factors may include, but are not limited to, low resources (e.g., fuel, battery), wireless signal strength being less than a signal strength threshold, environmental conditions, road hazards, unmapped areas, out-of-date maps, accidents, sensor failure conditions, etc. For example, the vehicle may stall in areas with potential sensor failure conditions. As one example, vehicle sensors (e.g., cameras) used to detect traffic light colors may fail to detect a color if an angle of the sun is within a certain range. As another example, light detection and ranging (LIDAR) sensors may not function in rain or fog. In yet another example, the vehicle may lose track of its position if the route includes areas with limited signals or no signals, such as a tunnel. The signals may include different communication signals, such as a global positioning system (GPS) signal, a wireless Internet signal, a cellular signal, etc.

As discussed, the stall factors may also include environmental conditions. For the sensors, such as a camera, the navigation system may determine backlight conditions, vehicle direction, traffic light locations, intersection arrival times, an angle of sun, weather, building information (e.g., whether buildings block the sun), etc. The aforementioned information, such as the sun's angle, may be included in the vehicle's stored map data. The information may also be obtained from the Internet or other data sources.

For a LIDAR sensor, and other sensors, weather conditions, such as humidity, may cause sensor failure. Thus, the navigation system may estimate various weather conditions, such as humidity, based on available weather information. The navigation system may also consider the time of day and/or the travel duration. For a GPS sensor, and other sensors, a weak signal or an interrupted signal may cause sensor failure. Thus, the navigation system may estimate signal strength for a route. The signal strength may be estimated based on, for example, building information (e.g., height and location), tunnel locations, terrain information (e.g., a height of surrounding mountains), a number of satellites, satellite positions, a number of cell towers, a number of WiFi transceivers, etc. The information may be stored in the map data.

In one configuration, the navigation system determines if a stall factor is greater than or less than a threshold. For example, if the amount of rain is greater than a rain threshold, the rain is determined to be a stall factor. If the rain is less than a threshold, the rain is not considered a stall factor. In another example, if buildings and/or surrounding environmental features cause a cellular signal to be less than a threshold, the buildings and/or surrounding environmental features are stall factors. If the cellular signal is greater than a threshold in view of the buildings and/or surrounding environmental features, the aforementioned elements are not risk factors. In one configuration, a customer cannot override or ignore considerations of whether a particular route may include a stall factor.

A stall factor may also include a calculation failure. For example, calculation errors in a route planning system (e.g., autonomous driving system) may occur when the vehicle travels through an outdated map area. The calculation errors may include errors in localization, object tracking, path planning, and/or other calculations. In one example, an outdated map may cause the route planning system to lose track of its location in relation to the map (e.g., localization error).

As another example, when the vehicle is in an outdated map area, the route planning system may mislabel surrounding objects (e.g., object tracking error) if one or more objects are tracked based on map information. In yet another when the vehicle is in an outdated map area, the route planning system, the route planning system may fail to remove intestinal information from the map. That is, the outdated map may increase the use of system resources, thereby causing delays or errors in calculations.

Figure 4:
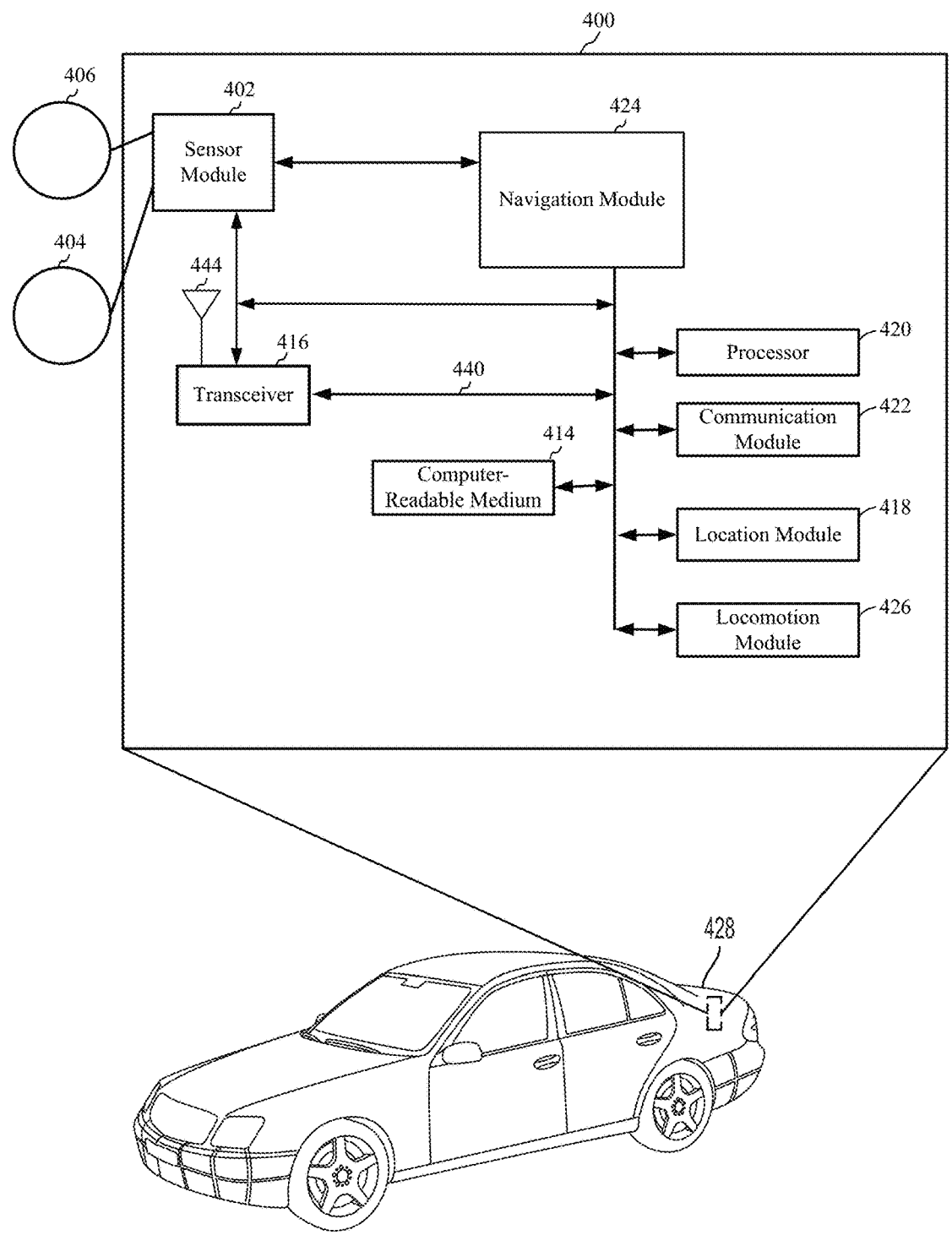
FIG. 4 is a diagram illustrating an example of a hardware implementation for an autonomous vehicle navigation system according to aspects of the present disclosure.

FIG. 4 is a diagram illustrating an example of a hardware implementation for a route planning system 400, according to aspects of the present disclosure. The route planning system 400 may be a component of a vehicle, a robotic device, or other device. For example, as shown in FIG. 4, the route planning system 400 is a component of an MAAS vehicle 428. Aspects of the present disclosure are not limited to the route planning system 400 being a component of the vehicle 428, as other devices, such as a bus, boat, drone, or robot, are also contemplated for using the route planning system 400. The vehicle 428 may be autonomous or semi-autonomous.

The route planning system 400 may be implemented with a bus architecture, represented generally by a bus 440. The bus 440 may include any number of interconnecting buses and bridges depending on the specific application of the route planning system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The route planning system 400 includes a transceiver 416 coupled to the processor 420, the sensor module 402, a comfort module 408, the communication module 422, the location module 418, the locomotion module 426, the navigation module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the comfort module 408 to a server (not shown).

The route planning system 400 includes the processor 420 coupled to the computer-readable medium 414. The processor 420 performs processing, including the execution of software stored on the computer-readable medium 414 providing functionality according to the disclosure. The software, when executed by the processor 420, causes the route planning system 400 to perform the various functions described for a particular device, such as the vehicle 428, or any of the modules 402, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406. The measurements of the first sensor 406 and the second sensor 404 may be processed by one or more of the processor 420, the sensor module 402, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the route planning system 400.

The locomotion module 426 may be used to facilitate locomotion of the vehicle 428. As an example, the locomotion module 426 may control movement of the wheels. As another example, the locomotion module 426 may be in communication with a power source of the vehicle 428, such as an engine or batteries. Of course, aspects of the present disclosure are not limited to providing locomotion via wheels and are contemplated for other types of components for providing locomotion, such as propellers, treads, fins, and/or jet engines.

The route planning system 400 also includes the navigation module 424 for planning a route or controlling the locomotion of the vehicle 428, via the locomotion module 426. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The navigation module 424 may be in communication with the sensor module 402, the transceiver 416, the processor 420, the communication module 422, the location module 418, the locomotion module 426, the planning module 424, and the computer-readable medium 414. In one configuration, the navigation module 424 receives a reservation from a customer via the processor 420 and/or the transceiver 416. The reservation may include a pickup location and a drop-off location. Based on the vehicle's 428 location obtained from the location module 418, the navigation module 424 determines a route to the pickup location, a route to the drop-off location, and/or a route to a return location.

For each route, the navigation module 424 determines whether the route includes a stall factor. That is, the navigation module 424 determines whether the vehicle 428 has a potential for stalling along each route. The stall factor(s) may be determined by information obtained from an external source, such as the Internet, via the transceiver 416, sensor data obtained from the sensor module 402, and/or map and environment data stored in the computer-readable medium 414 and/or a storage module (not shown).

For example, the navigation module 424 may determine backlight conditions at intersections, the vehicle's 428 direction at intersections, the positions of traffic lights, the arrival time at intersections, the position of the sun, weather at the intersections, building information, as well as other factors. If there is a potential for stalling along a route, the navigation module 424 may determine one or more alternate routes and/or alternate pickup or drop-off locations.

The navigation module 424 may also communicate with the customer via the transceiver 416 and/or communication module 422. For example, if one or more routes are not available, the navigation module 424 may use the transceiver 416 and/or the communication module 422 to inform the customer that the reservation cannot be honored. Alternatively, if the navigation module 424 determines that the trip can be completed, the navigation module 424 may use the transceiver 416 and/or the communication module 422 to inform the customer that the reservation can be honored. The navigation module 424 may transmit directions to the location module 418 to cause the vehicle 428 to drive on the determined route.

Figure 5:
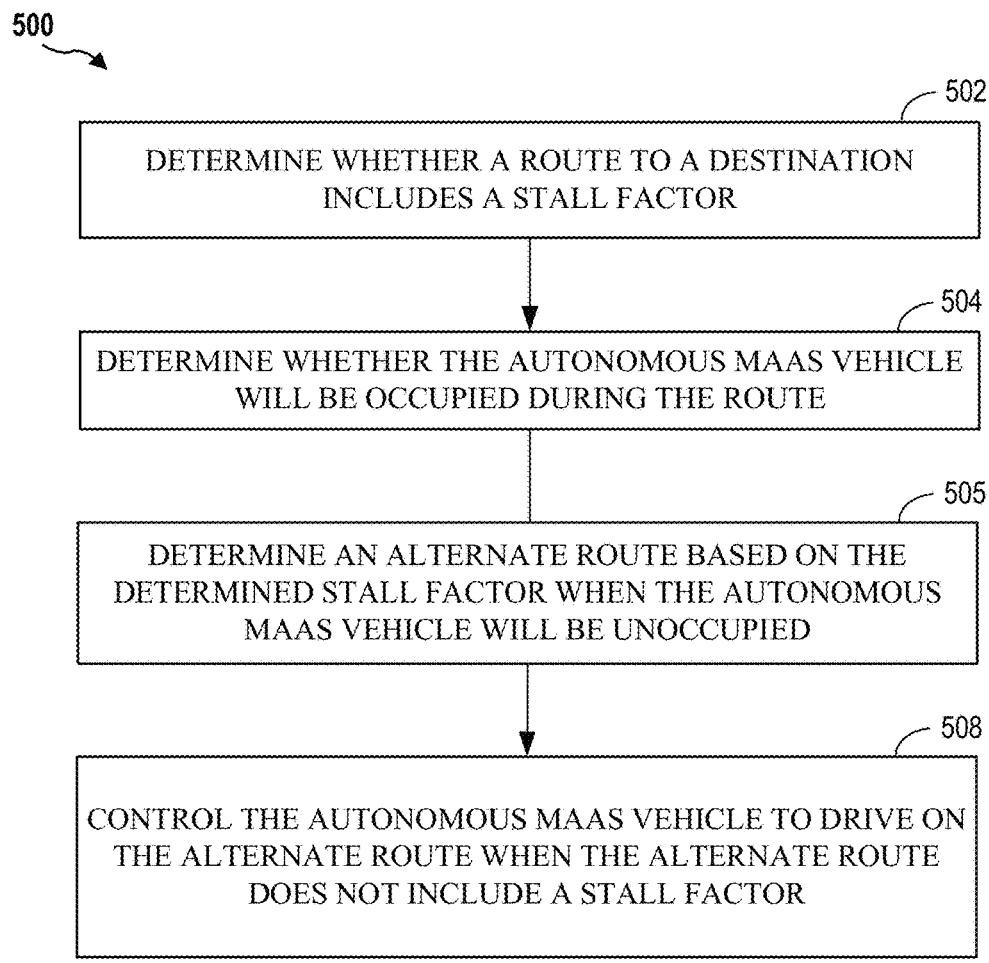
FIG. 5 illustrates a flow diagram for route planning for a vehicle according to aspects of the present disclosure.

FIG. 5 illustrates a method 500 for route planning for an autonomous vehicle according to an aspect of the present disclosure. As shown in FIG. 5, at block 502, a route planning system determines whether a stall factor is present during a route to a destination. The stall factor may include an environmental factor, an age of map data being greater than a threshold, missing map data, signal strength being less than a threshold, and/or a battery power being less than a threshold. The route may include a pickup route from an initial location to a customer pickup location, a drop-off route from the customer pickup location to a drop-off location, or a return route from the drop-off location to a return location. The route may be based on a reservation from a customer (e.g., occupant).

At block 504, the route planning system determines whether the autonomous vehicle will be occupied during the route. In an optional configuration, if the autonomous will be occupied, the route planning system determines whether an occupant is capable of driving the autonomous vehicle in a manual mode. At block 506, the route planning system determines an alternate route when the stall factor is present and when the autonomous vehicle is unoccupied during the route. At block 508, the route planning system controls the autonomous vehicle to drive on the alternate route when the alternate route does not include a stall factor.

In one configuration, the route planning system determines the alternate route when the stall factor is present and when the occupant is not capable of driving the autonomous vehicle in the manual mode. The route planning system may also determine whether a stall factor is present along the alternate route. The reservation may be cancelled if the alternate route includes a stall factor. In one configuration, an alternate destination is determined if a stall factor is present on the alternate route. The alternate destination may be a location within a threshold distance from the destination, a pre-determined location, or a mass transit location.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for route planning performed by an autonomous vehicle, comprising:
   receiving a request to autonomously navigate to a destination;
   determining a route to the destination based on the received request; identifying a stall factor on the route to the destination prior to departing to the destination, the stall factor delaying a time for arriving at the destination;
   determining an occupancy state of the autonomous vehicle in response to identifying the stall factor;
   determining an alternate route to the destination in response to identifying the stall factor and determining the autonomous vehicle is unoccupied; and
   controlling the autonomous vehicle to drive on the alternate route instead of the route when the alternate route does not include the stall factor.

2. The method of claim 1, further comprising:
   determining the autonomous vehicle is occupied based on the determined occupancy state; and
   determining an occupant is incapable of driving the occupied autonomous vehicle in a manual mode.

3. The method of claim 2, further comprising:
   determining the alternate route for the autonomous vehicle in response to identifying the stall factor and determining the occupant is incapable of driving the autonomous vehicle in the manual mode; and
   controlling the occupied autonomous vehicle to drive on the alternate route instead of the route when the alternate route does not include the stall factor.

4. The method of claim 1, in which the route is one of a pickup route from an initial location to a customer pickup location, a drop-off route from the customer pickup location to a drop-off location, or a return route from the drop-off location to a return location.

5. The method of claim 1, further comprising:
   determining the route based on a reservation from a customer; and
   cancelling the reservation when the alternate route comprises the stall factor.

6. The method of claim 1, further comprising determining an alternate destination in response to determining the alternate route comprises the stall factor.

7. The method of claim 1, in which the alternate destination is a location within a threshold distance from the destination, a pre-determined location, or a mass transit location.

8. The method of claim 1, in which the stall factor comprises at least one of an environmental factor, an age of map data being greater than an age threshold, missing map data, signal strength being less than a signal strength threshold, battery power being less than a battery power threshold, or a combination thereof.

9. The method of claim 1, further comprising:
   determining a duration of the stall factor of the route; and
   altering an action of the autonomous vehicle based on the duration.

10. An apparatus for route planning for an autonomous vehicle, the apparatus comprising:
    a memory; and
    at least one processor coupled to the memory, the at least one processor configured:
      to receive a request to autonomously navigate to a destination;
      to determine a route to the destination based on the received request;
      to identify a stall factor on the route to the destination prior to departing to the destination, the stall factor delaying a time for arriving at the destination;
      to determine an occupancy state of the autonomous vehicle in response to identifying the stall factor;
      to determine an alternate route to the destination in response to identifying the stall factor and determining the autonomous vehicle is unoccupied; and
      to control the autonomous vehicle to drive on the alternate route instead of the route when the alternate route does not include the stall factor.

11. The apparatus of claim 10, in which the at least one processor is further configured to:
   determine the autonomous vehicle is occupied based on the determined occupancy state; and
   determine an occupant is incapable of driving the occupied autonomous vehicle in a manual mode.

12. The apparatus of claim 11, in which the at least one processor is further configured to:
   determine the alternate route for the autonomous vehicle in response to identifying the stall factor and determining the occupant is incapable of driving the autonomous vehicle in the manual mode; and
   control the occupied autonomous vehicle to drive on the alternate route instead of the route when the alternate route does not include the stall factor.

13. The apparatus of claim 10, in which the route is one of a pickup route from an initial location to a customer pickup location, a drop-off route from the customer pickup location to a drop-off location, or a return route from the drop-off location to a return location.

14. The apparatus of claim 10, in which the at least one processor is further configured:
   to determine the route based on a reservation from a customer; and
   to cancel the reservation when the alternate route comprises the stall factor.

15. The apparatus of claim 10, in which the at least one processor is further configured to determine an alternate destination in response to determining the alternate route comprises the stall factor.

16. The apparatus of claim 10, in which the alternate destination is a location within a threshold distance from the destination, a pre-determined location, or a mass transit location.

17. The apparatus of claim 10, in which the stall factor comprises at least one of an environmental factor, an age of map data being greater than an age threshold, missing map data, signal strength being less than a signal strength threshold, battery power being less than a battery power threshold, or a combination thereof.

18. The apparatus of claim 10, in which the at least one processor is further configured:
   to determine a duration of the stall factor of the route; and
   to alter an action of the autonomous vehicle based on the duration.

19. A non-transitory computer-readable medium having program code recorded thereon for route planning for an autonomous vehicle, the program code executed by a processor and comprising:
   program code to receive a request to autonomously navigate to a destination;
   program code to determine a route to the destination based on the received request;
   program code to identify a stall factor on the route to the destination prior to departing to the destination, the stall factor delaying a time for arriving at the destination;
   program code to determine an occupancy state of the autonomous vehicle in response to identifying the stall factor;
   program code to determine an alternate route to the destination in response to identifying the stall factor and determining the autonomous vehicle is unoccupied; and
   program code to control the autonomous vehicle to drive on the alternate route instead of the route when the alternate route does not include the stall factor.

20. The non-transitory computer-readable medium of claim 18, in which the program code further comprises:
   program code to determine the autonomous vehicle is occupied based on the determined occupancy state;
   program code to determine an occupant is incapable of driving the occupied autonomous vehicle in a manual mode;
   program code to determine the alternate route for the autonomous vehicle in response to identifying the stall factor and determining the occupant is incapable of driving the autonomous vehicle in the manual mode; and
   program code to control the occupied autonomous vehicle to drive on the alternate route instead of the route when the alternate route does not include the stall factor.

* * * * *